US008634435B2

(12) United States Patent
Kadous et al.

(10) Patent No.: US 8,634,435 B2
(45) Date of Patent: Jan. 21, 2014

(54) SHORT TERM POLICY CREATION AND EXECUTION OF POLICY EXECUTED BETWEEN COMMUNICATION EVENTS OF A RADIO ACCESS TECHNOLOGY WITHIN A COEXISTENCE MANAGER HARDWARE/SOFTWARE IMPLEMENTATION

(75) Inventors: Tamer A. Kadous, San Diego, CA (US); Jibing Wang, San Diego, CA (US); Joel Benjamin Linsky, San Diego, CA (US); Ashok Mantravadi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 228 days.

(21) Appl. No.: 13/007,221

(22) Filed: Jan. 14, 2011

(65) Prior Publication Data
US 2012/0060158 A1 Mar. 8, 2012

Related U.S. Application Data

(60) Provisional application No. 61/319,109, filed on Mar. 30, 2010.

(51) Int. Cl.
*G06F 9/46* (2006.01)
*H04M 1/00* (2006.01)
*H04J 3/02* (2006.01)

(52) U.S. Cl.
USPC ........... 370/462; 718/100; 718/102; 718/103; 455/512

(58) Field of Classification Search
USPC .......................................... 718/100; 370/462
See application file for complete search history.

(56) References Cited

U.S. PATENT DOCUMENTS

| 8,190,200 | B2 * | 5/2012 | Conway et al. | 455/553.1 |
|---|---|---|---|---|
| 8,260,279 | B2 * | 9/2012 | Kiasaleh et al. | 455/418 |
| 2007/0066222 | A1 * | 3/2007 | Tao et al. | 455/41.2 |
| 2007/0291738 | A1 | 12/2007 | Nitsche et al. | |
| 2008/0240021 | A1 * | 10/2008 | Guo et al. | 370/328 |
| 2009/0016374 | A1 * | 1/2009 | Armstrong et al. | 370/462 |
| 2009/0298530 | A1 * | 12/2009 | Armstrong | 455/553.1 |
| 2010/0029325 | A1 * | 2/2010 | Wang et al. | 455/553.1 |
| 2010/0322287 | A1 * | 12/2010 | Truong et al. | 375/133 |

FOREIGN PATENT DOCUMENTS

WO WO2007031554 A1 3/2007

OTHER PUBLICATIONS

International Search Report and Written Opinion—PCT/US2011/030504, ISA/EPO—Jul. 6, 2011.

* cited by examiner

*Primary Examiner* — Lewis A Bullock, Jr.
*Assistant Examiner* — Kevin X Lu
(74) *Attorney, Agent, or Firm* — Rupit M. Patel

(57) ABSTRACT

A method of wireless communication includes partitioning coexistence tasks between short term policy setting tasks and policy implementing tasks, processing the short term policy setting tasks using a first set of computing resources, and processing the policy implementing tasks using a second set of computing resources. The first set may be software resources configured for slower execution of tasks and the second set may be hardware resources configured for just-in-time execution of tasks. The policy may determine a time after which a first radio event is not to be interrupted and granting or denying later events based on whether they would begin before or after the do-not-interrupt time. The do-not-interrupt time may be based on a weighted priority of the first radio event.

20 Claims, 12 Drawing Sheets

SHORT TERM POLICY CREATION AND EXECUTION OF POLICY EXECUTED BETWEEN COMMUNICATION EVENTS OF A RADIO ACCESS TECHNOLOGY WITHIN A COEXISTENCE MANAGER HARDWARE/SOFTWARE IMPLEMENTATION

CROSS REFERENCE TO RELATED APPLICATION

This application claims the benefit of U.S. Provisional Patent Application No. 61/319,109 filed Mar. 30, 2010, entitled "COEXISTENCE MANAGER HARDWARE/SOFTWARE IMPLEMENTATION," the disclosure of which is expressly incorporated herein by reference in its entirety.

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Some conventional advanced devices include multiple radios for transmitting/receiving using different Radio Access Technologies (RATs). Examples of RATs include, e.g., Universal Mobile Telecommunications System (UMTS), Global System for Mobile Communications (GSM), cdma2000, WiMAX, WLAN (e.g., WiFi), Bluetooth, LTE, and the like.

An example mobile device includes an LTE User Equipment (UE), such as a fourth generation (4G) mobile phone. Such 4G phone may include various radios to provide a variety of functions for the user. For purposes of this example, the 4G phone includes an LTE radio for voice and data, an IEEE 802.11 (WiFi) radio, a Global Positioning System (GPS) radio, and a Bluetooth radio, where two of the above or all four may operate simultaneously. While the different radios provide useful functionalities for the phone, their inclusion in a single device gives rise to coexistence issues. Specifically, operation of one radio may in some cases interfere with operation of another radio through radiative, conductive, resource collision, and/or other interference mechanisms. Coexistence issues include such interference.

This is especially true for the LTE uplink channel, which is adjacent to the Industrial Scientific and Medical (ISM) band and may cause interference therewith It is noted that Bluetooth and some Wireless LAN (WLAN) channels fall within the ISM band. In some instances, a Bluetooth error rate can become unacceptable when LTE is active in some channels of Band 7 or even Band 40 for some Bluetooth channel conditions. Even though there is no significant degradation to LTE, simultaneous operation with Bluetooth can result in disruption in voice services terminating in a Bluetooth headset. Such disruption may be unacceptable to the consumer. A similar issue exists when LTE transmissions interfere with GPS. Currently, there is no mechanism that can solve this issue since LTE by itself does not experience any degradation.

With reference specifically to LTE, it is noted that a UE communicates with an evolved NodeB (eNB; e.g., a base station for a wireless communications network) to inform the eNB of interference seen by the UE on the downlink. Furthermore, the eNB may be able to estimate interference at the UE using a downlink error rate. In some instances, the eNB and the UE can cooperate to find a solution that reduces interference at the UE, even interference due to radios within the UE itself. However, in conventional LTE, the interference estimates regarding the downlink may not be adequate to comprehensively address interference.

In one instance, an LTE uplink signal interferes with a Bluetooth signal or WLAN signal. However, such interference is not reflected in the downlink measurement reports at the eNB. As a result, unilateral action on the part of the UE (e.g., moving the uplink signal to a different channel) may be thwarted by the eNB, which is not aware of the uplink coexistence issue and seeks to undo the unilateral action. For instance, even if the UE re-establishes the connection on a different frequency channel, the network can still handover the UE back to the original frequency channel that was corrupted by the in-device interference. This is a likely scenario because the desired signal strength on the corrupted channel may sometimes be higher be reflected in the measurement reports of the new channel based on Reference Signal Received Power (RSRP) to the eNB. Hence, a ping-pong effect of being transferred back and forth between the corrupted channel and the desired channel can happen if the eNB uses RSRP reports to make handover decisions.

Other unilateral action on the part of the UE, such as simply stopping uplink communications without coordination of the eNB may cause power loop malfunctions at the eNB. Additional issues that exist in conventional LTE include a general lack of ability on the part of the UE to suggest desired configurations as an alternative to configurations that have coexistence issues. For at least these reasons, uplink coexistence issues at the UE may remain unresolved for a long time period, degrading performance and efficiency for other radios of the UE.

In order to manage communication via multiple radios and avoid collisions and/or interference between respective radios, a coexistence manager (CxM) and/or other means can be utilized to coordinate between respective radios that are in collision (e.g., radios configured such that their mutual operation would cause significant interference on at least one of the radios). To these ends, it would be desirable to implement techniques for filtering and grouping radios in order to expedite management operations performed with respect to such radios.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein.

SUMMARY

Figure 1:
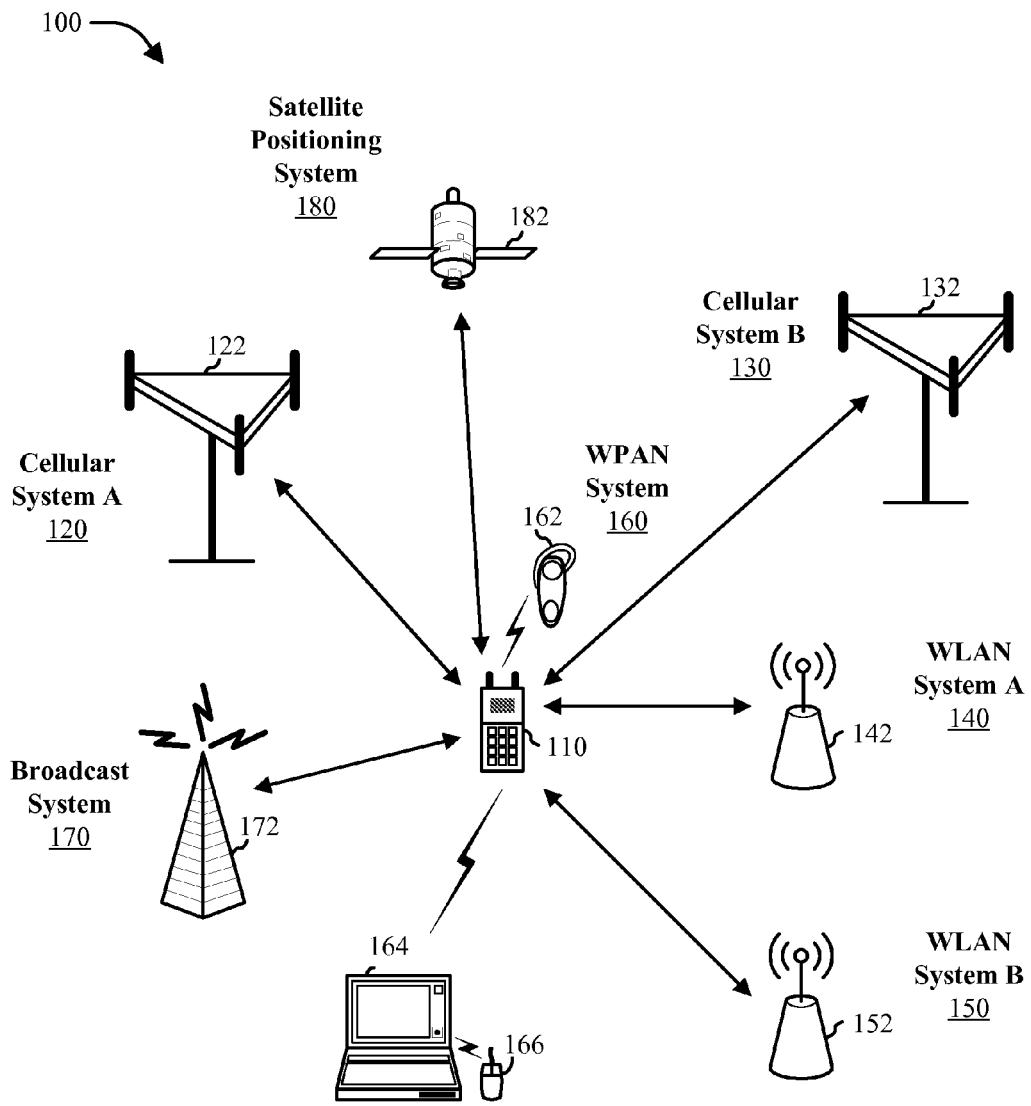
FIG. 1 is a block diagram of an example wireless communication environment in which various aspects described herein can function.

A method for wireless communications is offered. The method includes partitioning coexistence tasks between short term policy setting tasks and policy implementing tasks. The method also includes processing short term policy setting tasks using a first set of computing resources. The method further includes processing policy implementing tasks using a second set of computing resources.

An apparatus operable in a wireless communication system includes means for partitioning coexistence tasks between short term policy setting tasks and policy implementing tasks. The apparatus also includes means for processing short term policy setting tasks using a first set of computing resources. The apparatus further includes means for processing policy implementing tasks using a second set of computing resources.

A computer program product configured for wireless communication is offered. The computer program product includes a computer-readable medium having program code recorded thereon. The program code includes program code to partition coexistence tasks between short term policy setting tasks and policy implementing tasks. The program code also includes program code to process short term policy setting tasks using a first set of computing resources. The program code further includes program code to process policy implementing tasks using a second set of computing resources.

An apparatus configured for operation in a wireless communication network is offered. The apparatus includes a memory and a processor(s) coupled to memory. The processor(s) is configured to partition coexistence tasks between short term policy setting tasks and policy implementing tasks. The processor(s) is also configured to process short term policy setting tasks using a first set of computing resources. The processor(s) is further configured to process policy implementing tasks using a second set of computing resources.

DESCRIPTION

The techniques described herein can be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. For clarity, certain aspects of the techniques are described below for LTE, and LTE terminology is used in portions of the description below.

In an aspect, described herein are techniques for facilitating a coexistence manager (CxM) in a hardware (HW)-software (SW) implementation.

In one example, the CxM is a controller that finds systems-based solutions for coexistence interference problems that are not solvable by RF-only devices (e.g., filters, etc.). Various aspects of CxM design are provided herein which can facilitate the implementation of a flexible and extendable multi-radio management platform on one or more integrated circuits and/or other suitable means for use by a multi-radio wireless device.

Referring now to the drawings, FIG. 1 illustrates an example wireless communication environment 100 in which various aspects described herein can function. A wireless communication environment 100 can include a wireless device 110, which can be capable of communicating with multiple communication systems. These systems can include, for example, one or more cellular systems 120 and/or 130, one or more wireless local area network (WLAN) systems 140 and/or 150, one or more wireless personal area network (WPAN) systems 160, one or more broadcast systems 170, one or more satellite positioning systems 180, other systems not shown in FIG. 1, or any combination thereof. It should be appreciated that in the following description the terms "network" and "system" are often used interchangeably.

Cellular systems 120 and 130 can each be a CDMA, TDMA, FDMA, OFDMA, Single Carrier FDMA (SC-FDMA), or other suitable system. A CDMA system can implement a radio technology such as Universal Terrestrial Radio Access (UTRA), cdma2000, etc. UTRA includes Wideband CDMA (WCDMA) and other variants of CDMA. Moreover, cdma2000 covers IS-2000 (CDMA2000 1X), IS-95 and IS-856 (HRPD) standards. A TDMA system can implement a radio technology such as Global System for Mobile Communications (GSM), Digital Advanced Mobile Phone System (D-AMPS), etc. An OFDMA system can implement a radio technology such as Evolved UTRA (E-UTRA), Ultra Mobile Broadband (UMB), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2).

In an aspect, the cellular system 120 can include a number of base stations 122, which can support bi-directional communication for wireless devices within their coverage. Similarly, the cellular system 130 can include a number of base stations 132 that can support bi-directional communication for wireless devices within their coverage.

WLAN systems 140 and 150 can respectively implement radio technologies such as IEEE 802.11 (Wi-Fi), HiperLAN, etc. The WLAN system 140 can include one or more access points 142 that can support bi-directional communication. Similarly, the WLAN system 150 can include one or more access points 152 that can support bi-directional communication. The WPAN system 160 can implement a radio technology such as Bluetooth, IEEE 802.15, etc. Further, the WPAN system 160 can support bi-directional communication for various devices such as wireless device 110, a headset 162, a computer 164, a mouse 166, or the like.

The broadcast system 170 can be a television (TV) broadcast system, a frequency modulation (FM) broadcast system, a digital broadcast system, etc. A digital broadcast system can implement a radio technology such as MediaFLO™, Digital Video Broadcasting for Handhelds (DVB-H), Integrated Services Digital Broadcasting for Terrestrial Television Broadcasting (ISDB-T), or the like. Further, the broadcast system 170 can include one or more broadcast stations 172 that can support one-way communication.

The satellite positioning system 180 can be the United States Global Positioning System (GPS), the European Galileo system, the Russian Glonass system, the Quasi-Zenith Satellite System (QZSS) over Japan, the Indian Regional Navigational Satellite System (IRNSS) over India, the Beidou system over China, and/or any other suitable system. Further, the satellite positioning system 180 can include a number of satellites 182 that transmit signals used for position determination.

In an aspect, the wireless device 110 can be stationary or mobile and can also be referred to as a user equipment (UE), a mobile station, a mobile equipment, a terminal, an access terminal, a subscriber unit, a station, etc. The wireless device 110 can be a cellular phone, a personal digital assistant (PDA), a wireless modem, a handheld device, a laptop computer, a cordless phone, a wireless local loop (WLL) station, etc. In addition, the wireless device 110 can engage in two-way communication with the cellular system 120 and/or 130, the WLAN system 140 and/or 150, devices within the WPAN system 160, and/or any other suitable system(s) and/or device(s). The wireless device 110 can additionally or alternatively receive signals from the broadcast system 170 and/or satellite positioning system 180. In general, it can be appreciated that the wireless device 110 can communicate with any number of systems at any given moment. Also, the wireless device 110 may experience coexistence issues among various ones of its constituent radio devices that operate at the same time. Accordingly, the wireless device 110 includes a coexistence manager (CxM, not shown) that has a functional module to detect and mitigate coexistence issues, as explained further below.

Figure 2:
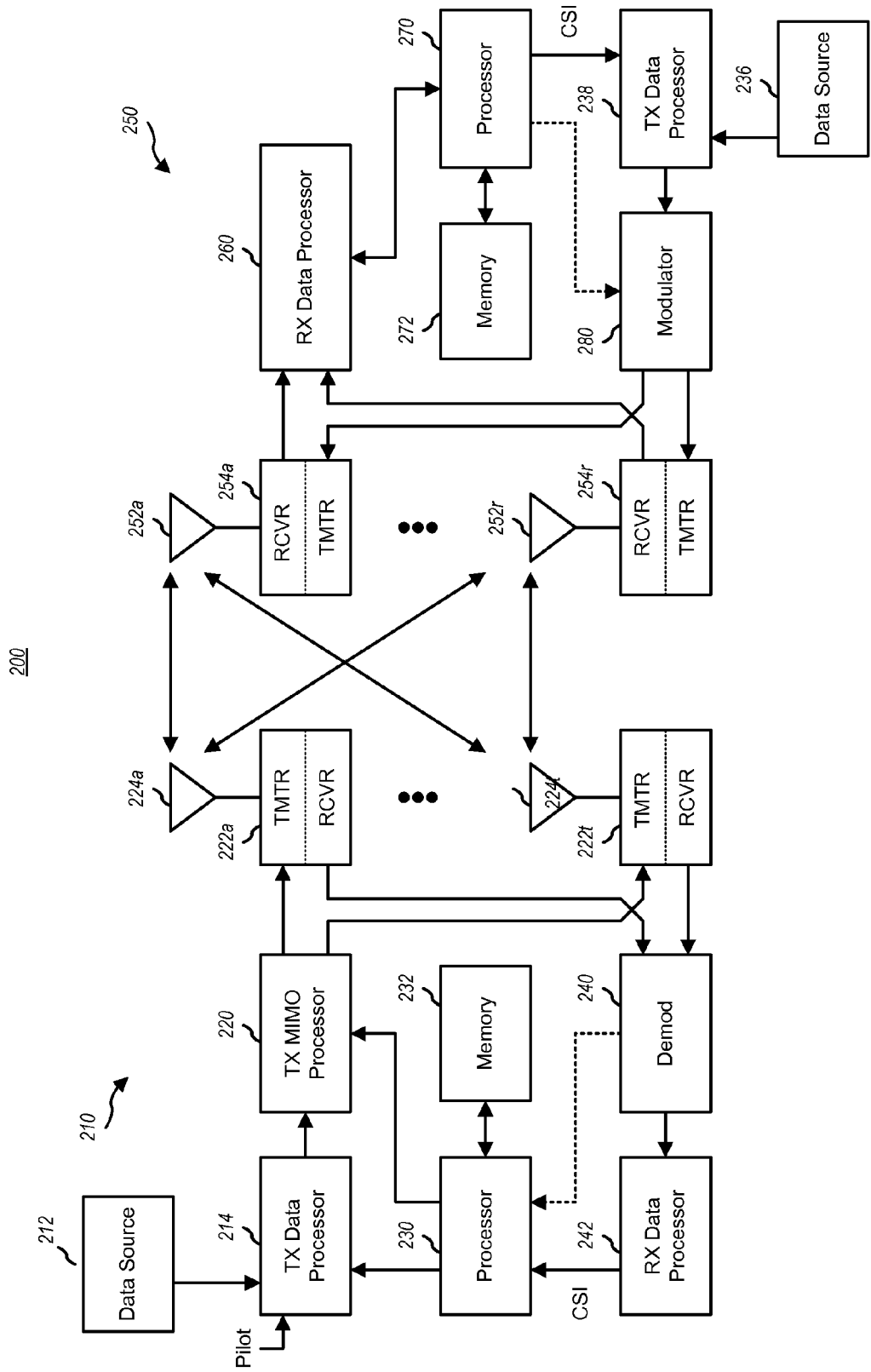
FIG. 2 is a block diagram of a communication system according to one aspect.

FIG. 2 is a block diagram of an aspect of a transmitter system 210 (also known as an eNB) and a receiver system 250 (also known as a UE) in a MIMO system 200. In some instances, both a UE and an eNB each have a transceiver that includes a transmitter system and a receiver system. At the transmitter system 210, traffic data for a number of data streams is provided from a data source 212 to a transmit (TX) data processor 214.

A MIMO system employs multiple (t) transmit antennas and multiple (r) receive antennas for data transmission. A MIMO channel formed by the t transmit and r receive antennas may be decomposed into s independent channels, which are also referred to as spatial channels, wherein $sS \leq \min\{t, r\}$. Each of the s independent channels corresponds to a dimension. The MIMO system can provide improved performance (e.g., higher throughput and/or greater reliability) if the additional dimensionalities created by the multiple transmit and receive antennas are utilized.

A MIMO system supports time division duplex (TDD) and frequency division duplex (FDD) systems. In a TDD system, the uplink and downlink transmissions are on the same frequency region so that the reciprocity principle allows the estimation of the downlink channel from the uplink channel. This enables the eNB to extract transmit beamforming gain on the downlink when multiple antennas are available at the eNB.

In an aspect, each data stream is transmitted over a respective transmit antenna. The TX data processor 214 formats, codes, and interleaves the traffic data for each data stream based on a particular coding scheme selected for that data stream to provide coded data.

The coded data for each data stream can be multiplexed with pilot data using OFDM techniques. The pilot data is a known data pattern processed in a known manner and can be used at the receiver system 250 to estimate the channel response. The multiplexed pilot and coded data for each data stream is then modulated (e.g., symbol mapped) based on a particular modulation scheme (e.g., BPSK, QSPK, M-PSK, or M-QAM) selected for that data stream to provide modulation symbols. The data rate, coding, and modulation for each data stream can be determined by instructions performed by a processor 230 operating with a memory 232.

The modulation symbols for respective data streams are then provided to a TX MIMO processor 220, which can further process the modulation symbols (e.g., for OFDM). The TX MIMO processor 220 then provides t modulation symbol streams to t transmitters (TMTR) 222a through 222t. In certain aspects, the TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. t modulated signals from the transmitters 222a through 222t are then transmitted from t antennas 224a through 224t, respectively.

At the receiver system 250, the transmitted modulated signals are received by r antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

A receive (RX) data processor 260 then receives and processes the r received symbol streams from r receivers 254 based on a particular receiver processing technique to provide r "detected" symbol streams. The RX data processor 260 then demodulates, deinterleaves, and decodes each detected symbol stream to recover the traffic data for the data stream. The processing by the RX data processor 260 is complementary to the processing performed by the TX MIMO processor 220 and the TX data processor 214 at the transmitter system 210.

A processor 270 (operating with a memory 272) periodically determines which pre-coding matrix to use (discussed below). The processor 270 formulates an uplink message having a matrix index portion and a rank value portion.

The uplink message can include various types of information regarding the communication link and/or the received data stream. The uplink message is then processed by a TX data processor 238, which also receives traffic data for a number of data streams from a data source 236, modulated by a modulator 280, conditioned by transmitters 254a through 254r, and transmitted back to the transmitter system 210.

At the transmitter system 210, the modulated signals from the receiver system 250 are received by antennas 224, conditioned by receivers 222, demodulated by a demodulator 240, and processed by an RX data processor 242 to extract the uplink message transmitted by the receiver system 250. The processor 230 then determines which pre-coding matrix to use for determining the beamforming weights, then processes the extracted message.

Figure 3:
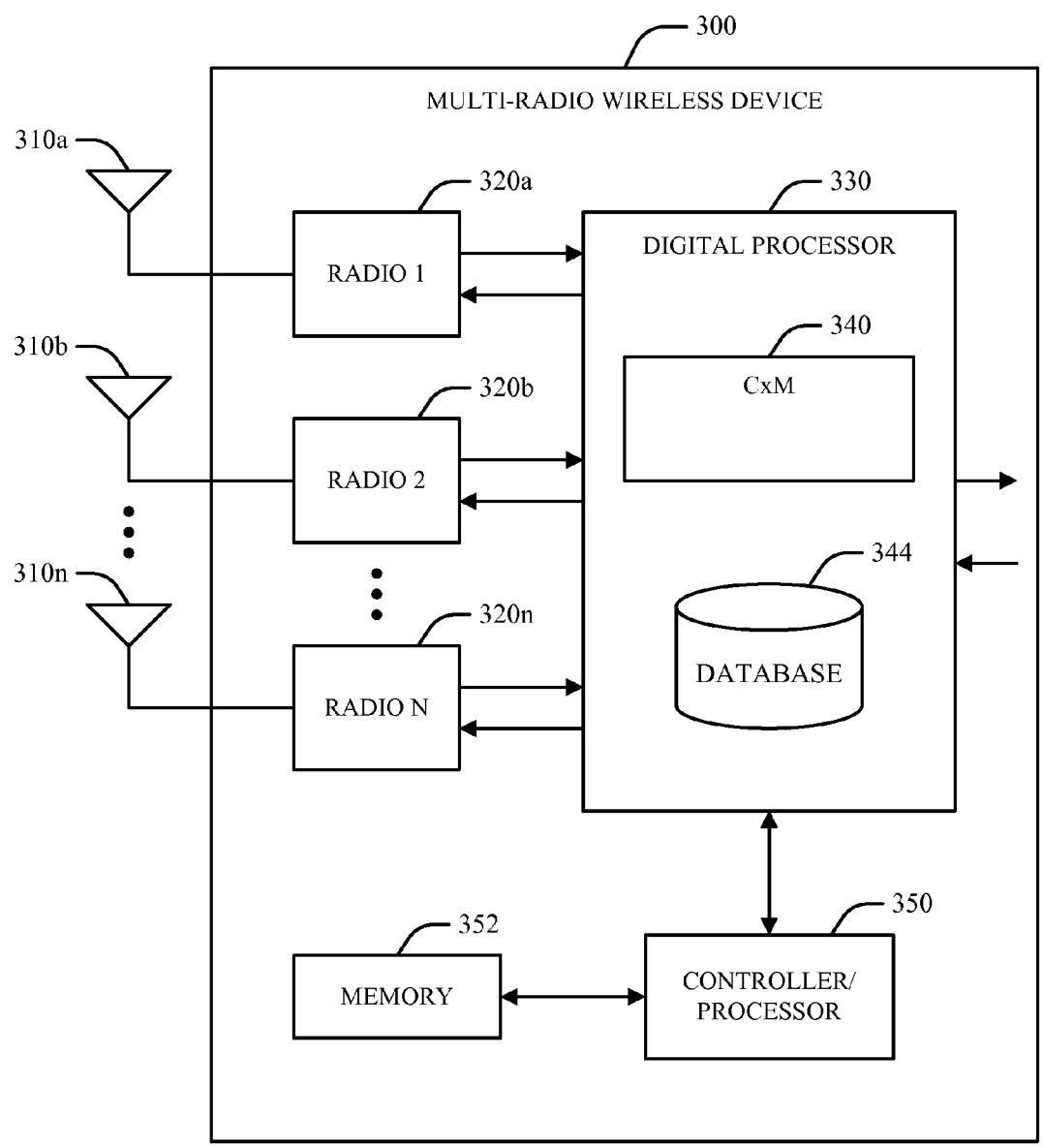
FIG. 3 is a block diagram of an example wireless device that can be operable to manage coexistence between respective radios in an associated wireless communication system.

Turning next to FIG. 3, a block diagram is provided that illustrates an example design for a multi-radio wireless device 300. As FIG. 3 illustrates, the wireless device 300 can include N radios 320a through 320n, which can be coupled to N antennas 310a through 310n, respectively, where N can be any integer value. It should be appreciated, however, that respective radios 320 can be coupled to any number of antennas 310 and that multiple radios 320 can also share a given antenna 310.

In general, a radio 320 can be a unit that radiates or emits energy in an electromagnetic spectrum, receives energy in an electromagnetic spectrum, or generates energy that propagates via conductive means. By way of example, a radio 320 can be a unit that transmits a signal to a system or a device or a unit that receives signals from a system or device. Accordingly, it can be appreciated that a radio 320 can be utilized to support wireless communication. In another example, a radio 320 can also be a unit (e.g., a screen on a computer, a circuit board, etc.) that emits noise, which can impact the performance of other radios. Accordingly, it can be further appreciated that a radio 320 can also be a unit that emits noise and interference without supporting wireless communication.

In an aspect, respective radios 320 can support communication with one or more systems. Multiple radios 320 can additionally or alternatively be used for a given system, e.g., to transmit or receive on different frequency bands (e.g., cellular and PCS bands).

In another aspect, a digital processor 330 can be coupled to radios 320a through 320n and can perform various functions, such as processing for data being transmitted or received via radios 320. The processing for each radio 320 can be dependent on the radio technology supported by that radio and can include encryption, encoding, modulation, etc., for a transmitter; demodulation, decoding, decryption, etc., for a receiver, or the like. In one example, the digital processor 330 can include a CxM 340 that can control the operation of radios 320 in order to improve the performance of the wireless device 300 as generally described herein. The CxM 340 can have access to a database 344, which can store information used to control the operation of radios 320. As explained further below, the CxM 340 can be adapted for a variety of techniques to decrease interference between the radios. In one example, the CxM 340 requests a measurement gap pattern or DRX cycle that allows when an ISM radio to communicate during periods of LTE inactivity.

For simplicity, the digital processor 330 is shown in FIG. 3 as a single processor. However, it should be appreciated that the digital processor 330 can comprise any number of processors, controllers, memories, etc. In one example, a controller/processor 350 can direct the operation of various units within the wireless device 300. Additionally or alternatively, a memory 352 can store program codes and data for the wireless device 300. The digital processor 330, controller/processor 350, and memory 352 can be implemented on one or more integrated circuits (ICs), application specific integrated circuits (ASICs), etc. By way of specific, non-limiting example, the digital processor 330 can be implemented on a Mobile Station Modem (MSM) ASIC.

Figure 4:
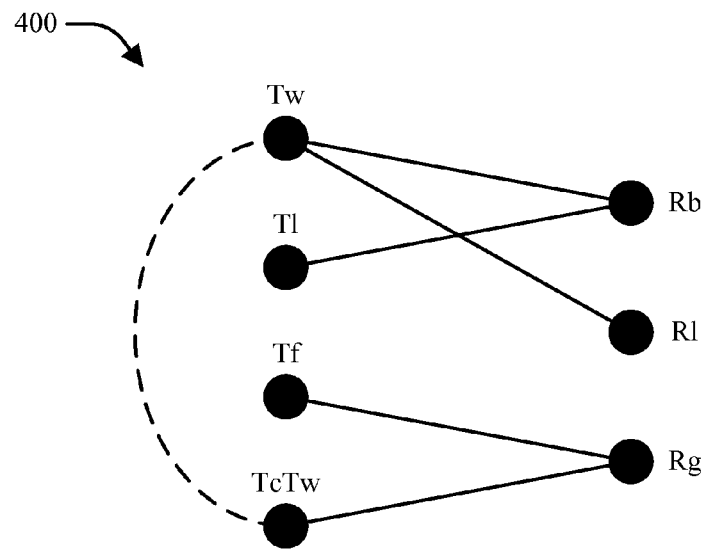
FIG. 4 illustrates an example set of radios that can be implemented in a wireless communication environment and respective potential collisions that can occur among the example set of radios.

In an aspect, the CxM 340 can be utilized to manage operation of respective radios 320 utilized by the wireless device 300 in order to avoid interference and/or other performance degradation associated with collisions between respective radios 320. By way of further illustration, a graph 400 in FIG. 4 represents respective potential collisions between seven example radios in a given decision period. In the example shown in the graph 400, the seven radios include a WLAN transmitter (Tw), an LTE transmitter (Tl), an FM transmitter (Tf), a GSM/WCDMA transmitter (Tc), an LTE receiver (Rl), a Bluetooth receiver (Rb), and a GPS receiver (Rg). The four transmitters are represented by four nodes on the left side of the graph 400, and the three receivers are represented by three nodes on the right side of the graph 400.

A potential collision between a transmitter and a receiver is represented on the graph 400 by a branch connecting the node for the transmitter and the node for the receiver. Accordingly, in the example shown in graph the 400, collisions may exist between (1) a WLAN transmitter (Tw) and a Bluetooth receiver (Rb); (2) a LTE transmitter (Tl) and a Bluetooth receiver (Rb); (3) a WLAN transmitter (Tw) and a LTE receiver (Rl); (4) a FM transmitter (Tf) and a GPS receiver (Rg); and (5) a WLAN transmitter (Tw), a GSM/WCDMA transmitter (Tc), and a GPS receiver (Rg).

Figure 5:
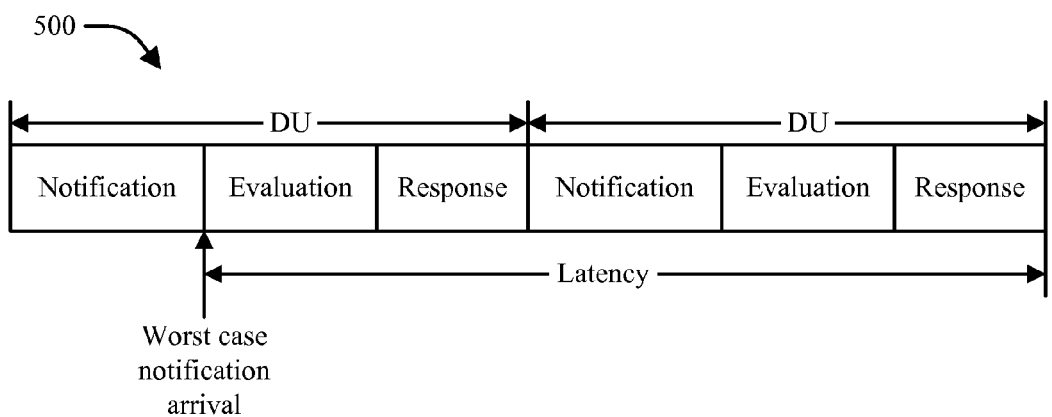
FIG. 5 illustrates operation of an example coexistence manager in time.

In another aspect, an example CxM 340 can operate in time in a manner such as that shown by diagram 500 in FIG. 5. As the diagram 500 illustrates, a timeline for CxM operation can be divided into Decision Units (DUs), which can be any suitable uniform or non-uniform length (e.g., 100 µs). By way of specific example, a DU can be divided into a notification phase (e.g., 50 µs) where various radios 320 send notifications of imminent events, an evaluation phase (e.g., 30 µs) where notifications are processed, and a response phase (e.g., 20 µs) where commands are provided to various radios 320 and/or other operations are performed based on actions taken in the evaluation phase. In one example, the timeline shown in the diagram 500 can have a latency parameter defined by the worst case operation of the timeline, e.g., the timing of a response in the case that a notification is obtained from a given radio immediately following termination of the notification phase in a given DU.

In-device coexistence problems can exist for a UE between resources such as, for example, LTE and ISM bands (e.g., for Bluetooth/WLAN). In current LTE implementations, any interference issues to LTE are reflected in the downlink measurements (e.g., Reference Signal Received Quality (RSRQ) metrics, etc.) reported by a UE and/or the downlink error rate which the eNB can use to make inter-frequency or inter-RAT handoff decisions, e.g., to move LTE to a channel or RAT with no coexistence issues. However, it can be appreciated that these existing techniques will not work if, for example, the LTE uplink is causing interference to Bluetooth/WLAN but the LTE downlink does not see any interference from Bluetooth/WLAN. More particularly, even if the UE autonomously moves itself to another channel on the uplink, the eNB can in some cases handover the UE back to the problematic channel for load balancing purposes. In any case, it can be appreciated that existing techniques do not facilitate use of the bandwidth of the problematic channel in the most efficient way.

Various aspects described herein facilitate implementation of a multi-radio CxM solution wherein CxM tasks are split on the basis of processing time. Thus, for example, various approaches described herein enable CxM tasks to be split into non-real time (e.g., control plane (CP)) tasks and real time/just-in-time (e.g., data plane (DP)) tasks while maintaining solution flexibility. By implementing a split architecture in this manner, removal of CxM processing time from the CPU critical path can be facilitated.

Figure 6:
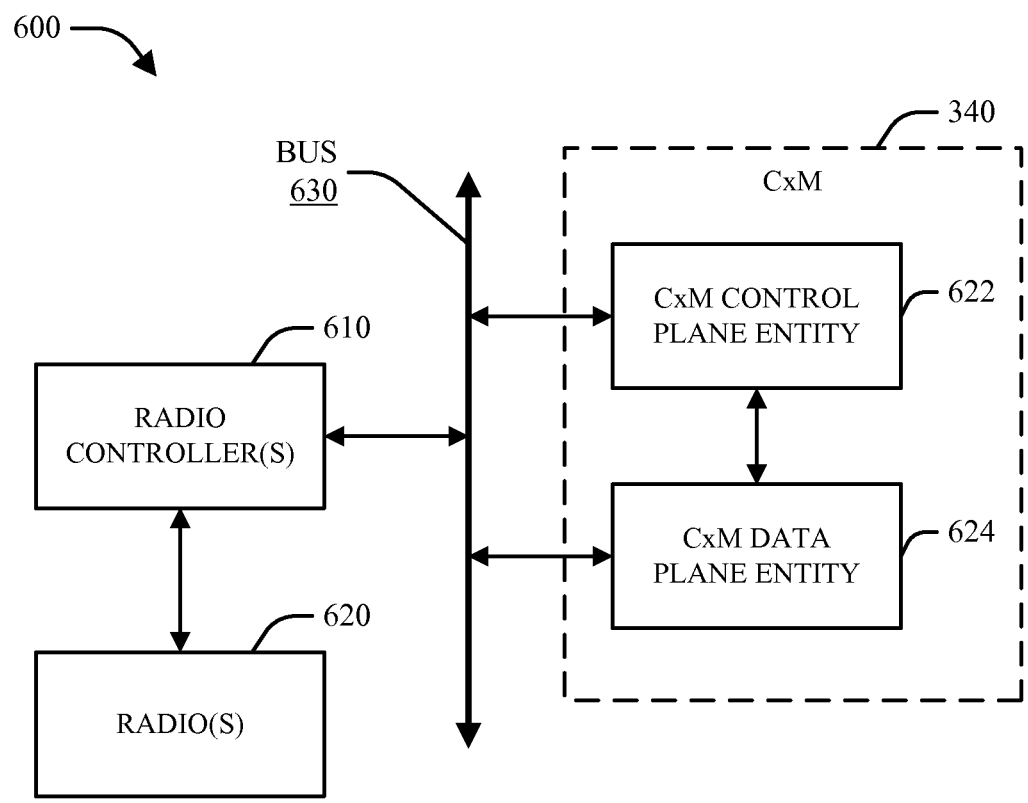
FIG. 6 is a block diagram that illustrates an example CxM hardware/software implementation.

By way of example, a multi-radio coexistence architecture as described herein can be implemented as shown by a system 600 in FIG. 6. As shown in the system 600, functionality of a CxM 340 can be split into a control plane (CP)/software entity 622 and a data plane (DP)/hardware entity 624, which can communicate directly and/or by means of a bus 630 and/or other suitable means. As additionally shown in the system 600 and generally described herein, the CxM 340 can manage one or more radios 620, either directly or via respective corresponding radio controllers 610. While the system 600 illustrates the CxM 340 managing respective radios 620 and radio controllers 610 by way of the bus 630, it should be appreciated that such management can be facilitated by any suitable system.

In an aspect, the CxM 340 as described herein can operate on the basis of Network Events (NEs). As used herein, a NE is a report sent by a radio 620 to the CxM 340 to inform the CxM 340 that an event is forthcoming along with the parameters of an upcoming event. Accordingly, CxM logic can be based on knowledge of various information from respective NEs, such as event start and end times, event priorities, center frequency, Transmission (Tx) power, Reception (Rx) required signal-plus interference to-noise ratio (SINR), or the like.

In one example, event priority can be processed according to respective bins and/or other suitable priority structures. A bin represents a grouping of events with identical priorities. For example, bins can be ordered by priority and configured such that two events falling in the same bin have the same priority. Subsequently, if colliding events are in different bins, hard arbitration can be performed such that, e.g., the event in the higher priority bin always wins and is given the grant to execute. Alternatively, if colliding events are in the same bin, soft arbitration can be performed according to an internal algorithm to determine the priority of colliding events in the same bin to determine which event should receive a grant. In one aspect the internal algorithm may be based on the history of grants in the bin.

Figure 7:
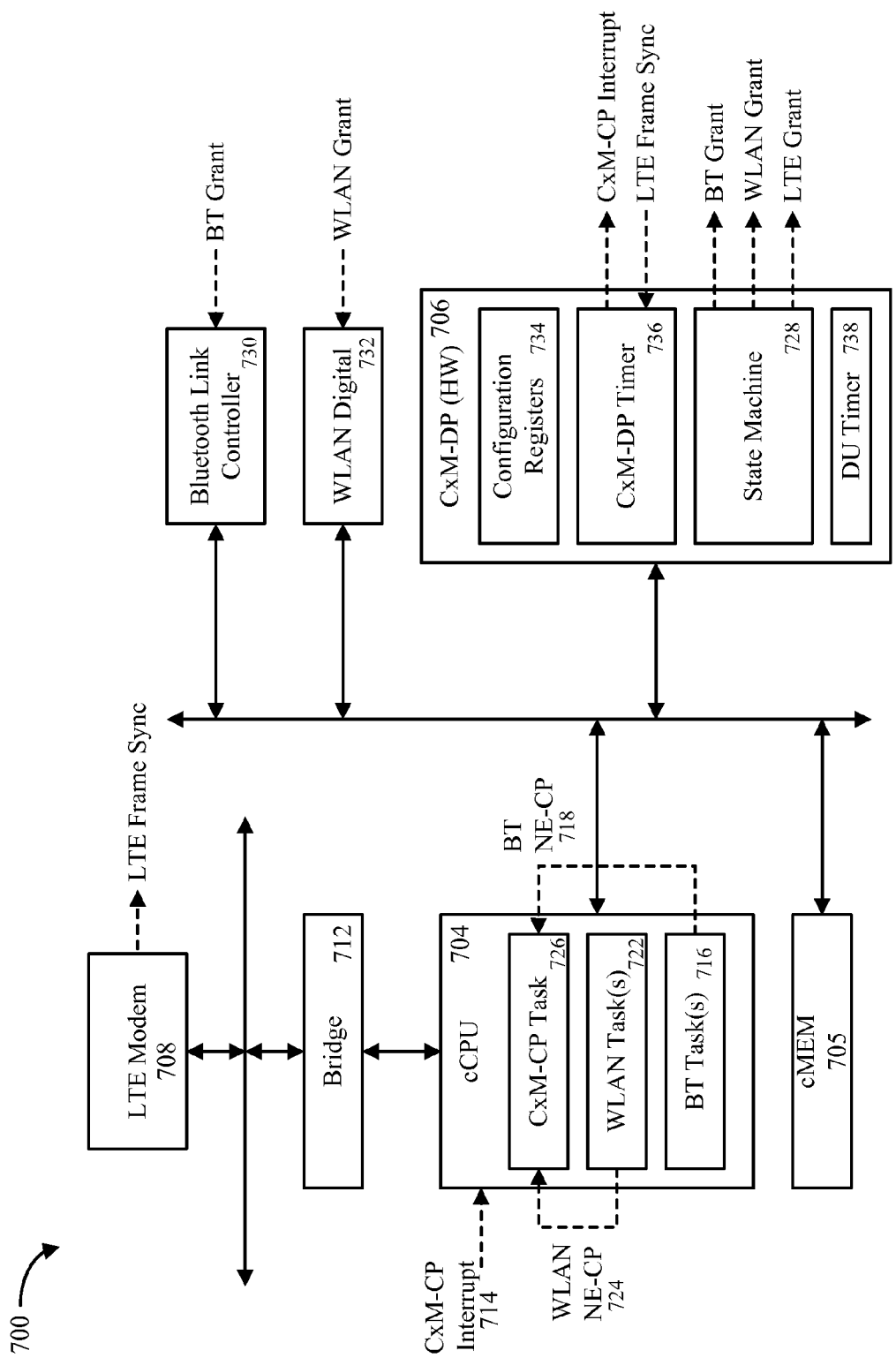
FIG. 7 illustrates various aspects of an example CxM hardware/software implementation.

In another aspect, an example hardware architecture that can be utilized for CxM operation as described herein is illustrated by a diagram 700 in FIG. 7. As shown in the diagram 700, control plane (CP) and data plane (DP) aspects of a CxM can be implemented via separate mechanisms (e.g., a connectivity CPU (cCPU) 704 or the like for control plane operation, CxM-data plane logic 706 for data plane operation, etc.). Connectivity memory 705 is also provided to store configurations or data for the CPUs. While the diagram 700 and various aspects of the following description relate to coexistence between LTE and Bluetooth (BT) radios, it should be appreciated that similar techniques could be applied to manage coexistence between any suitable radio(s).

In one example, an architecture as illustrated by diagram 700 and/or any other appropriate architecture can facilitate CxM-control plane processing for the specific, non-limiting example of LTE/Bluetooth coexistence by setting initial grants for LTE and/or running Bluetooth events. When the LTE Modem 708 has an event, it communicates data regarding the event to the CxM 726 through the Bridge 712. Further, control plane processing can be utilized to predict future grant decisions for new Bluetooth events. The grant predictions can be used to configure a data plane entity for ongoing grant decisions. In one example, CxM-control plane processing can utilize an interrupt source 714 that is a 1 ms timer (e.g., from hardware) or the like, which can be associated with an acceptable access delay of approximately 300 μs. Further, CxM-control plane processing can run in a CPU and/or other suitable integrated circuit or any other suitable means.

In an aspect, a NE-control plane event (e.g., a notification event to a CxM control plane entity) can be sent under various circumstances. For example, a Bluetooth radio may send a task 716, such as a NE-control plane item 718 as part of the pre-slot interrupt (e.g., as a NE sent by the Bluetooth firmware to the CxM control plane entity upon starting Bluetooth Tx/Rx activity). Further, for Rx events, the number of slots can be sent by the Bluetooth firmware following the header interrupt. In an aspect, LTE NE-control plane processing can require that LTE NEs are available at the CxM control plane entity before the update. In another example a WLAN radio 722 can send a NE-control plane 724 to the CxM-control plane processor 726.

In another example, CxM-data plane processing can be facilitated by the architecture illustrated by diagram 700 and/or any other suitable architecture for the specific, non-limiting example case of LTE/Bluetooth coexistence in the following manner. In an aspect, a CxM data plane entity 706 can be configured to run an algorithm for each Bluetooth event. Complexity of the algorithm can be a function of a variety of factors, such as CxM-control plane update rate (e.g., such that the faster the rate, the more information is known by the CxM control plane and, correspondingly, the less processing is required of the CxM data plane entity).

In another aspect, a CxM data plane entity 706 can be primarily dedicated to resolving collisions between new Bluetooth events and, in some cases, may have no knowledge of LTE events. Further, the CxM data plane entity can send responses (e.g., grants or denials) for new Bluetooth, WLAN, or LTE events. Such grants may be coordinated by a state machine 728. Grants may be received by a BT controller 730 or WLAN controller 732. Additionally, the CxM data plane entity may, in some cases, overwrite the initial LTE response set by the CxM control plane entity as a result of one or more new Bluetooth events. The CxM-DP may include configuration registers 734 and a timer 736.

In one example, DU operation of a CxM can be controlled at least in part by control plane processing. Thus, for example, CxM-control plane processing can execute every DU, and the CxM-data plane processing can be executed by the control plane processing whenever a Bluetooth event is found. A DU Timer 738 may be used by the CxM.

In an aspect, an example CxM control plane/data plane implementation can operate as described below. As used in the following description, various assumptions relating to timing of the system are made for purposes of simplicity and illustration only. Various other timing configurations are operable using the implementations described herein. The criteria for the assumptions are later provided in further detail. As initially shown in diagram 800 in FIG. 8, LTE events are assumed to be known TLTE (e.g., 1 ms) prior to their execution. Further, the CxM-control plane update boundaries (represented by the dotted vertical lines in FIG. 8) are assumed to be offset approximately 500 μs from the LTE subframe boundaries (represented by the dashed vertical lines in FIG. 8) and to take place every 1 ms. Further, at each control plane update, the CxM is assumed to know about LTE events for the following 1.5 ms, a duration referred to herein as the grant prediction interval (GPI). This grant prediction interval enables the CxM to set a coexistence policy for short term periods to prepare for potential Bluetooth events. The CxM does not know about Bluetooth events until approximately 100-150 μs before the event. As used herein "short term" or "short term policy" means a term or policy coinciding with the CxM's knowledge of a forthcoming event from a particular communication resource (in particular an LTE radio) whose events the CxM knows about farther in advance of other communication resources (such as a Bluetooth radio).

Because the CxM will have longer notice of LTE events than it has of Bluetooth events, it may prepare an arbitration scheme based on expected LTE events such that if an upcoming Bluetooth event becomes known to the CxM it can be ready with a procedure to determine whether to grant the Bluetooth event, based on ongoing LTE events, expected LTE events, timing of the Bluetooth event, the number of LTE events the Bluetooth event may collide with, event priority and/or other factors. In this manner, each 1 ms, a CxM may configure a grant prediction interval (1.5 ms) period of potential conflicts between LTE events and potential Bluetooth events. Depending on system operation, the CxM may have more or less notice of LTE or Bluetooth events.

Figure 8:
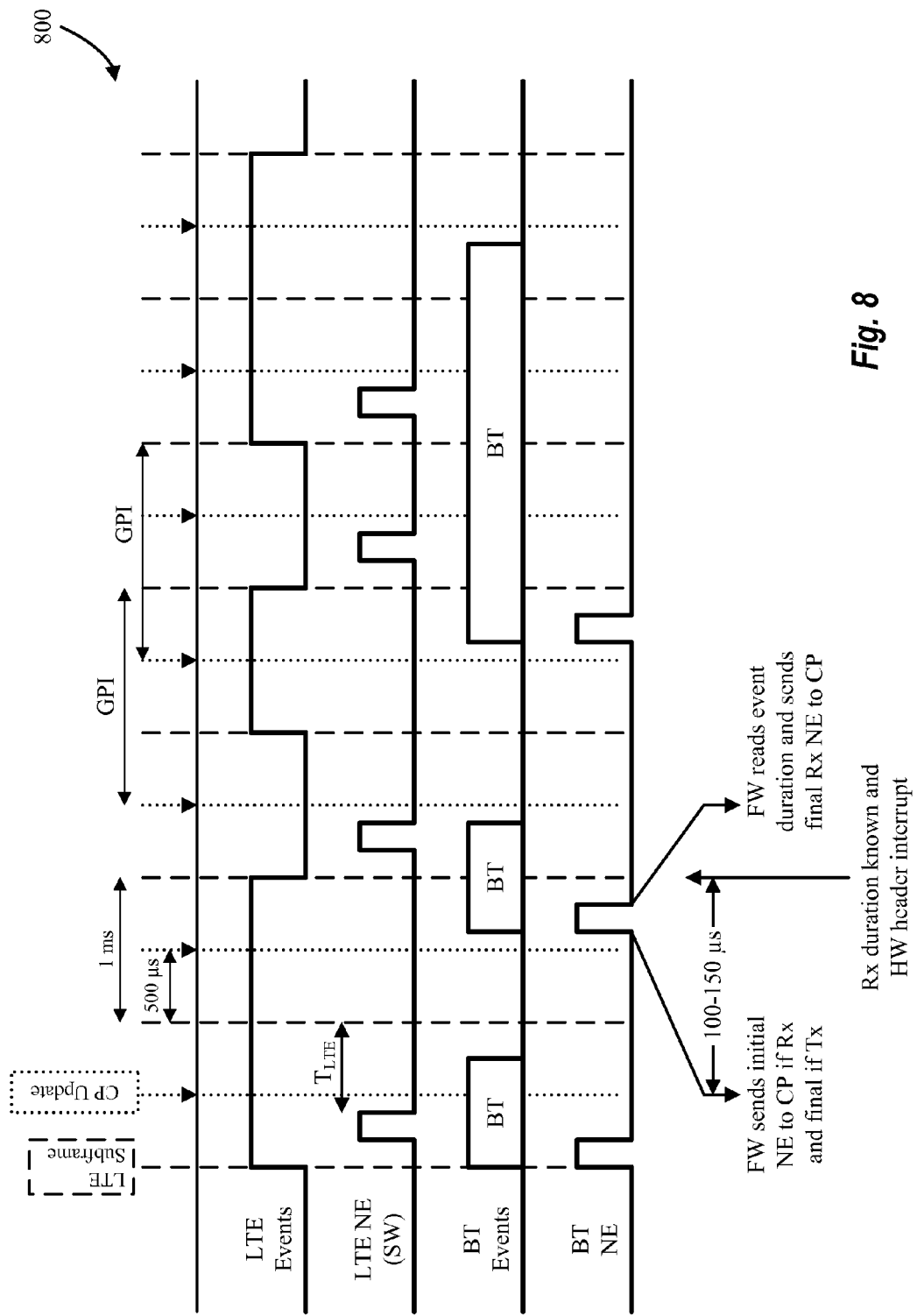
FIGS. 8-10 illustrate respective examples of operation of various radios and corresponding multi-radio coexistence solutions in time.

As seen in FIG. 8, at the first LTE subframe (leftmost dashed line) and LTE event is occurring, as is a Bluetooth event. A Bluetooth NE also occurs. Shortly thereafter, a LTE NE occurs (in software (SW)), as the system is aware that an LTE event will occur at the next LTE subframe. The LTE NE occurs TLTE (e.g., 1 ms) before the next LTE subframe. At the next subframe (third from left vertical dashed line) the LTE even ends. A Bluetooth event is also occurring at that time.

In each control plane update, a CxM control plane entity can determine respective conditions for granting a new Bluetooth event based on its arrival time for the next grant prediction interval. In one example, this can be achieved based on the assumption that within the next grant prediction interval, the control plane entity has exact knowledge of the LTE events. Subsequently, the control plane can configure an associated data plane entity to check the determined conditions in real time in order to determine a grant decision for respective Bluetooth events.

In an aspect, the CxM control plane entity can process respective LTE/Bluetooth radios in the following manner for each collision link (e.g., LTE Tx/Bluetooth Rx or vice versa). In one example, CxM-control plane operation can be configured with three main flags—e.g., LTE-R (indicating that there is an LTE event running), LTE-N (indicating that there is a next LTE event detected), and BT (indicating that there is a Bluetooth event running). As the function of the CxM is to mitigate conflicts between radios, it can be appreciated that the CxM-control plane operation may be configured such that LTE-R and Bluetooth cannot both be '1' or otherwise simultaneously true, as simultaneous operation may lead to interference.

Based on the above flags, a grant vector X can be defined to be a 1×3 vector, constructed as [initial grant of LTE-R, initial grant of LTE-N, grant of Bluetooth], wherein '1' represents a grant and '0' represents a denial. The grant vector may be used to determine grant/collision status and may be used by the control plane to configure the data plane. Depending on the configuration of the grant vector X an indicator to always allow Bluetooth events (illustrated in the chart as "is AllBTWin" may be set (to 1) or reset (to 0). Various possible configurations of X and their corresponding CxM actions are illustrated by Table 1 as follows:

TABLE 1

Example CxM-control plane processing per collision link

| LTE-R | LTE-N | BT | Action | Diagram Illustration |
|---|---|---|---|---|
| 0 | 0 | 0 | BT always wins: isAllBTWin = 1 | |
| 0 | 0 | 1 | BT always wins: isAllBTWin = 1 | 902 |
| 0 | 1 | 0 | Predict BT over LTE-N, X = x10, isAllBTWin = 0 | 904 |
| 1 | 1 | 1 | Not allowed if there is a collision | |
| 1 | 0 | 0 | Predict BT over LTE-R, X = 1x0, isAllBTWin = 0 | 906 |
| 1 | 0 | 1 | Not allowed if there is a collision | |
| 1 | 1 | 0 | Predict BT over LTE-R and LTE-N, X = 110, isAllBTWin = 0 | 908 |
| 0 | 1 | 1 | isAllBTWin = 0, X is collision dependent | 910 |

Figure 9:
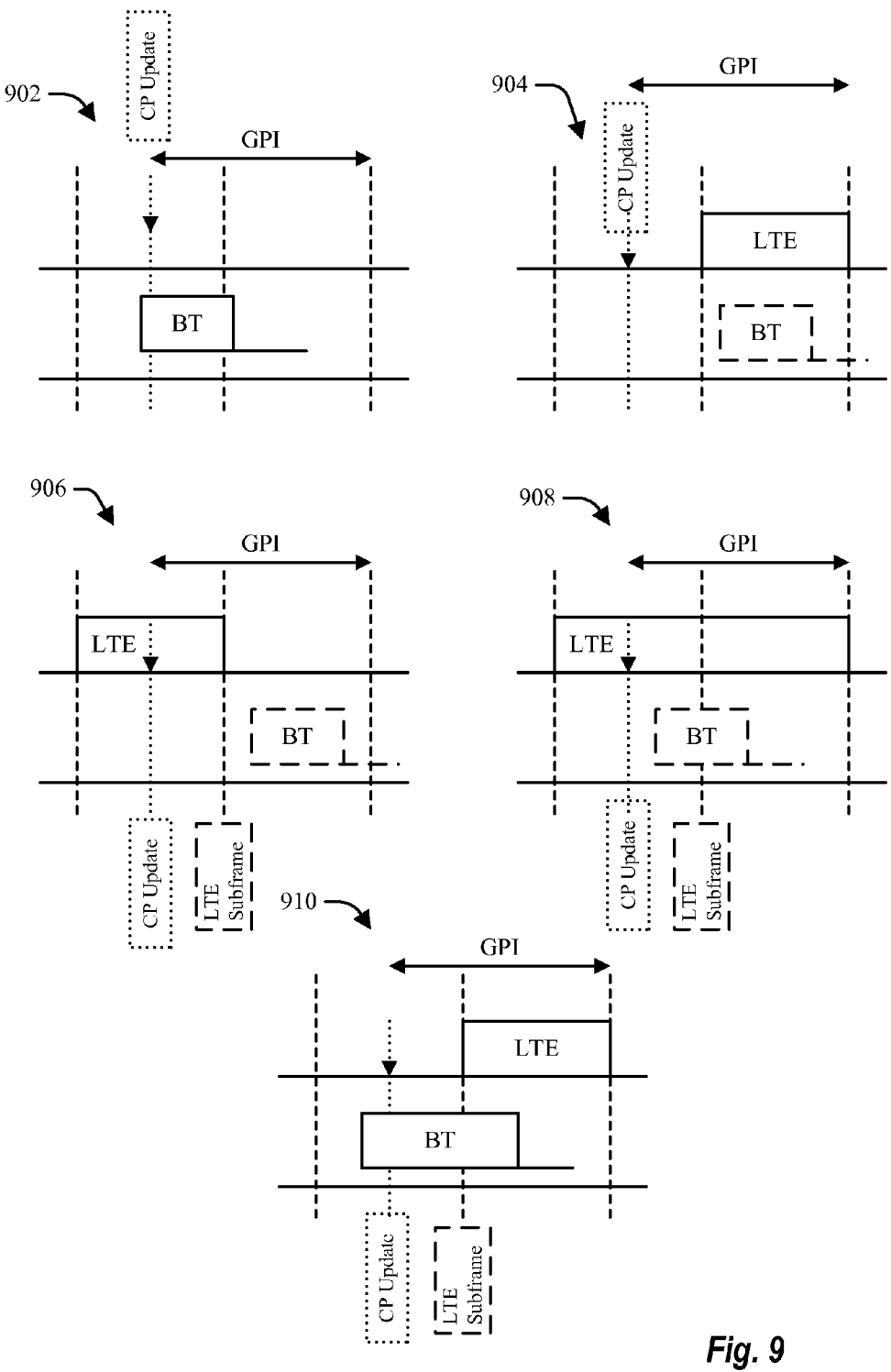

Various scenarios provided by Table 1 above are illustrated by diagrams 902-910 in FIG. 9. The center dashed vertical line of each of diagrams 902-910 represents the divider between LTE subframes such that an LTE event on the left side of the center line will be a running event and an LTE event on the right side of the center line will be a next event. If an LTE event appears on the left of the center vertical line, the LTE-R bit of grant vector X will be set to 1. If an LTE event appears on the right of the center vertical line, the LTE-N bit of grant vector X will be set to 1. The dotted vertical line with an arrow indicates the control plane (CP) update boundary. If a Bluetooth event appears on control plane update boundary, the Bluetooth bit of grant vector X will be set to 1.

Diagram 902 shows no running LTE event, no upcoming (next) LTE event, and a running Bluetooth event. Thus grant vector X will be 001 for diagram 902. Diagram 904 shows no running LTE event, a next LTE event, and no Bluetooth event at the control plane update boundary, but a potential future Bluetooth event at some future time. Thus grant vector X will be 010 for diagram 904. Diagram 906 shows a running LTE event, no next LTE event, and no Bluetooth event at the control plane update boundary, but a potential future Bluetooth event at some future time. Thus grant vector X will be 100 for diagram 906. Diagram 908 shows a running LTE event, a next LTE event, and no Bluetooth event at the control plane update boundary, but a potential future Bluetooth event at some future time. Thus grant vector X will be 110 for diagram 908. Diagram 910 shows no running LTE event, a next LTE event, and a Bluetooth event at the control plane update boundary. Thus grant vector X will be 011 for diagram 910.

In one example, CxM-control plane processing for substantially all cases in Table 1 above except for the 110 case can be handled as special cases in the manner shown by Table 1. For the 110 case, a CxM control plane entity can be utilized to predict Bluetooth over a grant prediction interval in the manner described below. Initially, the CxM control plane entity can have as input a LTE NE within 500 µs of the start of the event and a Bluetooth NE shortly after the start of the event, including the event duration.

Based on these inputs, an algorithm for Bluetooth prediction can be conducted as follows. In certain situations it may be desirable to determine a Bluetooth grant based on what portion of one or more LTE events would conflict with the Bluetooth event. For example, if an LTE event is nearing completion at the time of a Bluetooth event, the Bluetooth event may be denied so that the LTE event may complete execution. In another example, if an LTE event has only just begun at the time of a Bluetooth event, the Bluetooth event may be granted. In such a manner the CxM may reduce processing time given to LTE events which may be interrupted by Bluetooth events.

Before processing, the control plane can check the grant vector X as updated by the data plane to ascertain which grant decision(s) were taken by the data plane in the previous grant prediction interval. Next, the time t0 is found, after which a new Bluetooth event will not collide with a running LTE event (LTE-R) and will only collide with a next LTE event (LTE-N). If a Bluetooth event starts at or after time t0 it would only interfere with the LTE-N period. If a Bluetooth event starts before time t0 it may interfere with both the LTE-R and LTE-N periods.

As noted above, if a Bluetooth event is to interfere with one or more LTE events, it may be desired to evaluate how far along the LTE event is when determining whether to allow the Bluetooth event to interrupt one or more LTE events. Adaptive arbitration with scaled priority factors may be used in this process. A scaled priority factor is a variable priority assignment for a particular event where the priority of the event changes (for example, increases) as the event nears completion. Thus, an event that has just started may be lower in priority than the same event just before it completes. Such scaled priority factors may be used to reduce wasting of processor resources by protecting almost completed events from interruption from all but very high priority of competing events. The CxM may take into account such scaled priority factors in determining whether to interrupt an LTE event depending on when during the LTE event a competing Bluetooth event would begin. In particular, such adaptive arbitration may be implemented during soft arbitration to arbitrate between LTE and Bluetooth events that at first seem to have equal priority.

Figure 10:
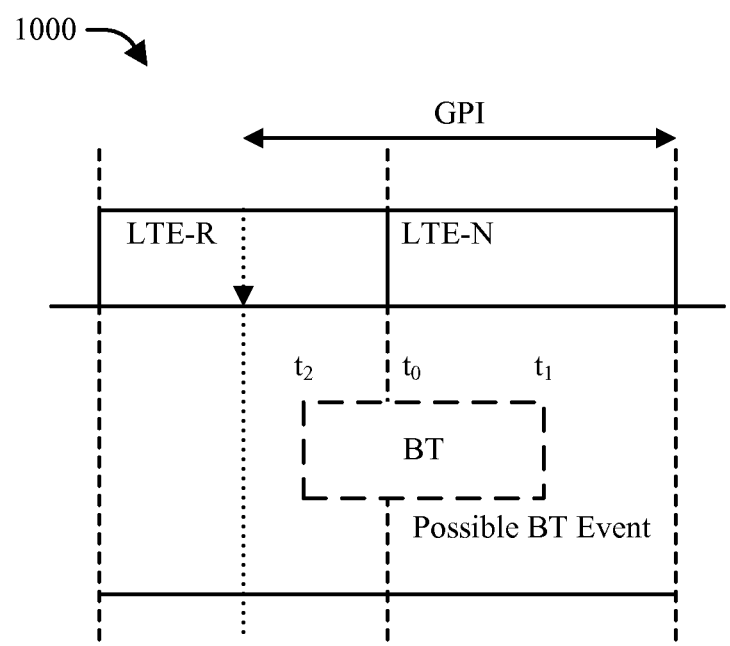

Referring to the diagram 1000 in FIG. 10, a second time t1, which is later than t0, is then found such that if a new Bluetooth event starts after t1, the Bluetooth event would be denied so that the LTE-N event may complete. If the Bluetooth event would occur between times t0 and t1, the Bluetooth event would take priority over LTE-N as LTE-N will have been determined to not be far enough along to take priority over the Bluetooth event. Additionally, a third time t2, which is earlier than time t0, can be found such that if a new Bluetooth event starts before time t2, it would be allowed, but if it comes after time t2 it would not be allowed. Time t2 may be chosen based on the scaled priority of LTE-R so that before a certain point (t2) in the execution of LTE-R it may be interrupted by a Bluetooth event, but after that point LTE-R is permitted to complete execution. For purposes of illustration times t0, t1, and t2 are shown in diagram 1000, but their specific and relative values may be chosen by the CxM according to various system constraints.

In addition, an LTE bin array Bin_LTE can be constructed, having elements Bin_LTE(1)=Bin_LTE-N and Bin_LTE(2)=max (Bin_LTE-R, Bin_LTE-N). Thus, Bin_LTE(1) will be set to the priority level of the LTE-N event and Bin_LTE(2) will be set to the highest priority level of the LTE-R event and the LTE-N event. Subsequently, the CxM control plane entity can output t0, t1, and t2 as well as the 2×1 LTE bin array Bin_LTE. Thus, if a Bluetooth event starts after time t0, Bin_LTE(1) may be used to determine if the Bluetooth event has a higher priority than the one LTE event the Bluetooth event may collide with. If the Bluetooth event starts before time t0, Bin_LTE(2) may be used to determine if the Bluetooth event has a higher priority than the highest priority of the two LTE events the Bluetooth event may collide with. If the Bluetooth event has equal priority to the one or more LTE events it may collide with, soft arbitration using times t1 and t2 described above may be implemented to determine priority between the Bluetooth event and potentially interfering LTE events. Establishing times t0, t1, and t2, as well as the LTE bin arrays, may allow a CxM to reduce processing time given to LTE events which may be interrupted by Bluetooth events, as described below.

In another example, the CxM may take into account the periodic nature of Bluetooth scheduling when determining arbitration between Bluetooth and LTE. Bluetooth event slots may occur every 625 µs and alternate between Tx slots and Rx slots. Because interference occurs when one radio is trying to receive while the other is transmitting, if forthcoming LTE events are only receive events, arbitration may only be necessary for Bluetooth transmission (Tx) slots. Accordingly, the CxM may take notice of the Bluetooth slots within the grant prediction interval to perform arbitration between Bluetooth and LTE.

In another aspect, a CxM data plane entity can operate as described herein based on respective inputs and outputs as described as follows. In one example, the data plane can receive various inputs from the control plane (e.g., configuration parameters, etc.) for each collision link. These inputs can include is AllBTWin (a flag to bypass arbitration and always grant Bluetooth), fL and fH (the range of frequencies of Bluetooth between which collision may occur), t0, t1, and t2, grant vector X (initial grants and denials), Bin_LTE, and so on. Further, the data plane can receive various inputs from a Bluetooth NE. These inputs can include, for example, f (Bluetooth frequency), t (Bluetooth start time), Bin_BT (Bluetooth bin), or the like. It can be appreciated that, as noted above, the data plane is not required to have knowledge of the Bluetooth event end time. Based on such inputs, a corresponding CxM data plane entity can output a new grant vector after considering any new Bluetooth event appearing in a given grant prediction interval.

Figure 11:
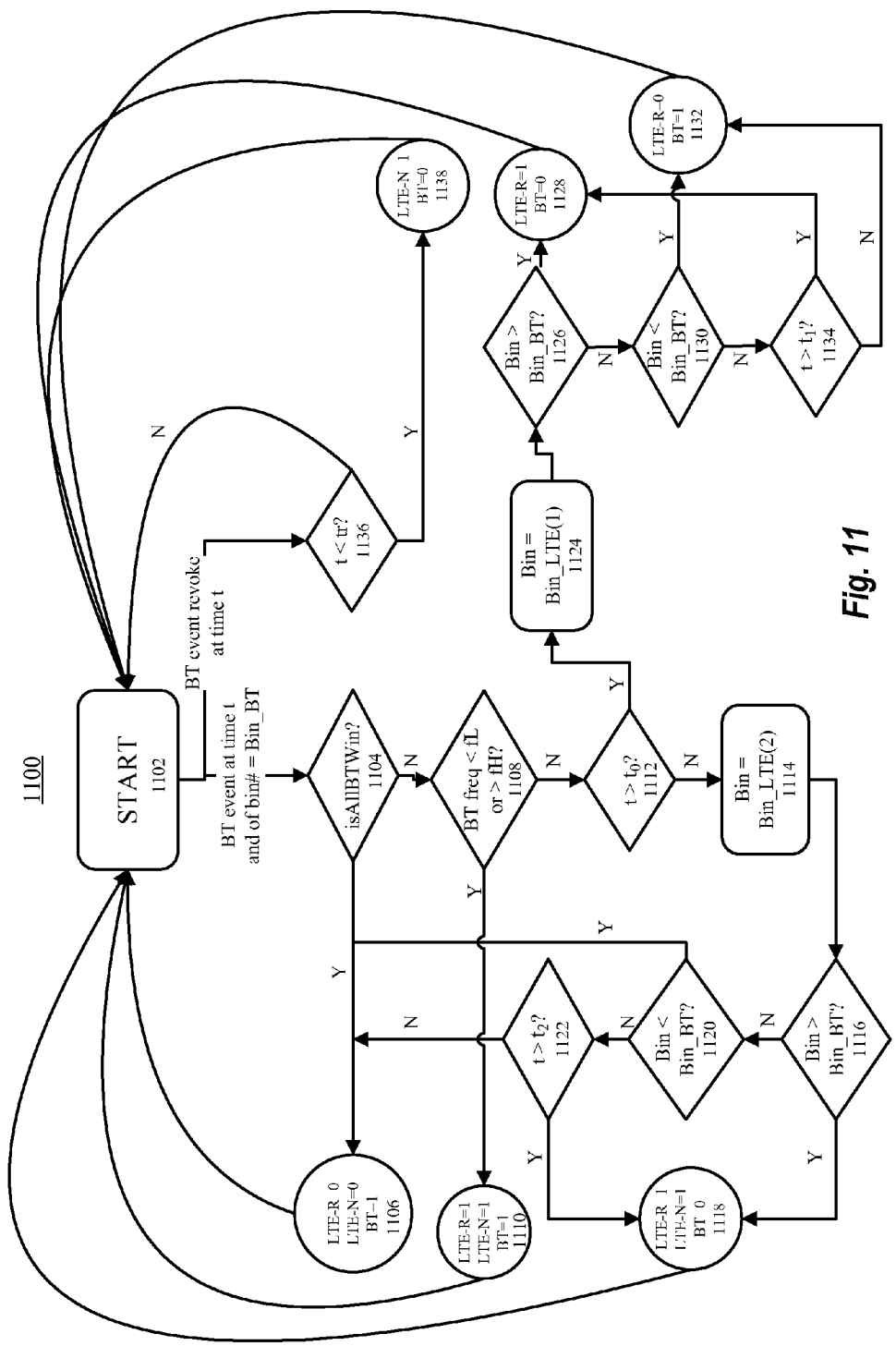
FIG. 11 is a flow diagram that illustrates an example CxM data plane processing algorithm.

In one example, based on the above inputs and outputs, a CxM data plane entity can conduct processing as shown by flow diagram 1100 in FIG. 11. It can be appreciated that if the CxM data plane entity is implemented in hardware, then it can be executed every DU where the hardware checks if a NE has been received from Bluetooth and runs the data plane logic. If a Bluetooth event is granted, the grant will be conveyed to the Bluetooth transmitter sufficiently in advance to not delay the Bluetooth event. If a Bluetooth event is known to a CxM 150 µs prior to the event, the grant will be conveyed to the Bluetooth transmitted by time T3 where time T3=150 µs−(T1+T2) where time T1 is the delay between sending the notification event to the data plane and time T2 is the time for the data plane to process the state machine of FIG. 11 to determine whether to grant the Bluetooth event.

As shown in FIG. 11, at the start of each BT event 1102, if a Bluetooth event is indicated at time t, its bin number is set to Bin_Bt, as indicated between blocks 1102 and 1104 in FIG. 11. If all BT win mode 1104 is determined to be set in block 1104, then LTE-R is set to 0, LTE-N is set to 0 and BT is set to 1 as shown in block 1106, indicating that a Bluetooth event is coming and should be permitted. If Bluetooth win mode is not active (1104: NO), then the Bluetooth frequency is checked to see if it is in the potentially interfering frequency range between a low frequency (fL) and high frequency (fH) as shown in block 1108. If the Bluetooth communications are below the low frequency (fL) or above the high frequency (fH) and the Bluetooth and LTE may coexist (1108: YES), then LTE-R is set to 1, LTE-N is set to 1 and BT is set to 1 as shown in block 1110.

If, however, the Bluetooth communications are between the low frequency (fL) and the high frequency (fH), then the Bluetooth and LTE are potentially interfering and may not necessarily coexist (1108: NO), thereby leading to the remaining checks of FIG. 11. Following a determination of potential interference, a check is made if t>t0 as shown in block 1112. If t is not greater than t0 the Bin is set to Bin_LTE (2) as shown in block 1114 and the value of Bin is compared to Bin_BT as shown in block 1116. If Bin is greater than Bin_BT than the Bluetooth event will not receive priority and LTE-R is set to 1, LTE-N is set to 1 and BT is set to 0 as shown in block 1118. If Bin is less than Bin_BT, as determined by block 1120, then the Bluetooth event will be allowed and the bits will be set as shown in block 1106. If Bin=Bin_BT, then a comparison will be made between t and t2 as shown in block 1122. If t>t2, then the bits will be set as shown in block 1118. If not, then the grant vector will be set as shown in block 1106.

Returning to block 1112, if t is greater than t0 the Bin is set to Bin_LTE(1) as shown in block 1124. If Bin is greater than Bin_BT as determined in block 1126, then LTE-R is set to 1 and BT is set to 0 as shown in block 1128. If Bin is less than Bin_BT as determined in block 1130, then LTE-R is set to 0 and BT is set to 1 as shown in block 1132. If Bin=Bin_BT, then a comparison will be made between t and t1 as shown in block 1134. If t>t1, then the grant vector bits will be set as shown in block 1128. If not, then the bits will be set as shown in block 1132.

Turning now to event between blocks 1102 and 1136 of FIG. 11. This portion of FIG. 11 relates to a specific aspect in Bluetooth where the receiver is continually checking for data. A CxM may allocate resources to the Bluetooth modem, however the Bluetooth modem may determine that there is no data to receive. In that case, the Bluetooth modem may release the resources back to the CxM. However if the resources are not released in time, there may be insufficient time for the CxM to reallocate those resources to the LTE modem. The time point at which reallocation is not possible is referred to as tr. To determine whether to revoke a Bluetooth event at particular time t, a comparison is made between t and tr as shown in block 1136. If t is not less than tr then no action is taken and the process returns to the start. If t is less than tr then LTE-N is set to 1 and BT is set to 0 as shown in block 1138.

In a further aspect, CxM control plane/data plane operation as described herein can operate according to various specifications and/or requirements. For example, CxM-control plane processing can be performed with an interrupt rate of 1 ms with a possible access delay of <300 µs. Further, the CxM-control plane can receive a LTE NE approximately 500+ µs from the start of the event. Additionally or alternatively, the CxM-control plane can receive a Bluetooth NE from Bluetooth firmware immediately following the end of the pre-slot interrupt plus an additional delay of 100-200 µs in the case of a Rx event (e.g., to account for event duration).

In one example, the CxM-control plane can use an internal timer to determine the update time, and can be configured with the ability to update the count if needed. In another example, various aspects provided herein can assume CxM-control plane alignment with the LTE timeline (e.g., using frame synchronization). Further, depending on the latency required by a radio to react to a response, one or more signals can be directly connected to the radio.

As noted above, while various aspects herein are directed to the specific, non-limiting case of Bluetooth/LTE coexistence, a CxM as implemented herein can be utilized to manage coexistence between any suitable radios. Thus, as an additional non-limiting example, coexistence between LTE, Bluetooth, and WLAN radios can be facilitated as provided below.

Figure 12:
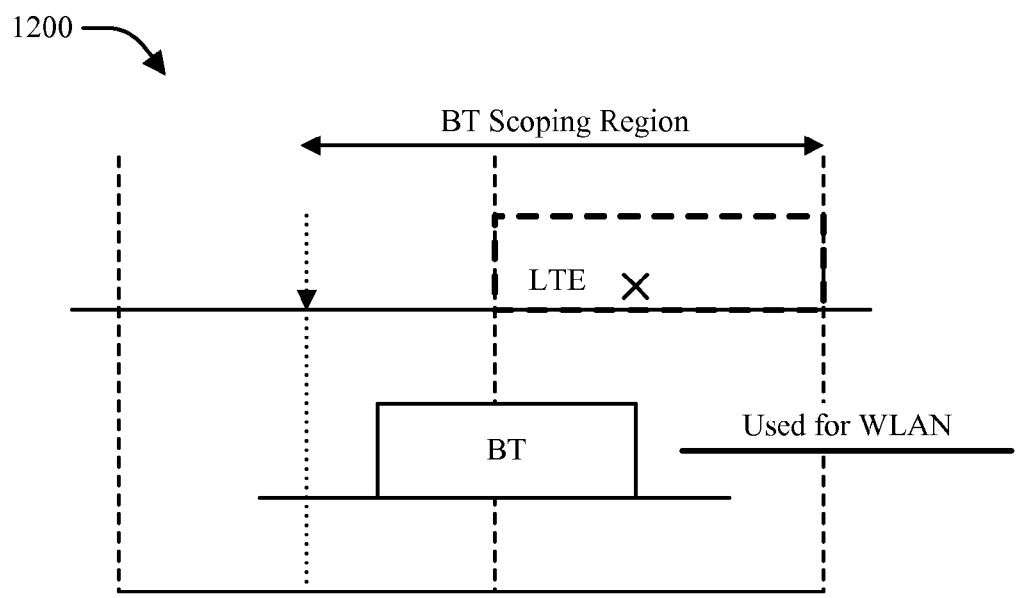
FIG. 12 illustrates a further example of operation of various radios and corresponding multi-radio coexistence solutions in time.

In a first scenario (e.g., as illustrated by diagram 1200 in FIG. 12), LTE/Bluetooth/WLAN coexistence can be conducted for LTE, active Bluetooth, and ideal WLAN as follows. Based on an assumption that the WLAN active time to read a beacon is known at least one scope region ahead of time, CxM-control plane processing can be conducted as follows. In particular, the beacon interval can span one or more scope regions and a flag can be added to mask a duration where the data plane logic is not used (e.g., in which the initial X provided via CxM-control plane processing is always in effect). Thus, when it is desired to grant WLAN and to stop LTE Tx, the CxM-control plane can set the grant vector X=x0x, indicating that the LTE-N event collides with WLAN, but that there is no collision between the WLAN event and LTE-R or Bluetooth.

In an aspect, the above approach can be performed as long as the CxM-control plane knows which duration is to be utilized for WLAN (e.g., such that arbitration on resources is done in the CxM-control plane and, if WLAN is granted, LTE and/or Bluetooth are stopped as described above). However, if active arbitration on an event-by-event basis is needed (e.g., a WLAN application is not tolerable to latency), then additional policies and/or solutions can be implemented to manage coexistence of the WLAN radio and its potentially conflicting radios.

Figure 13:
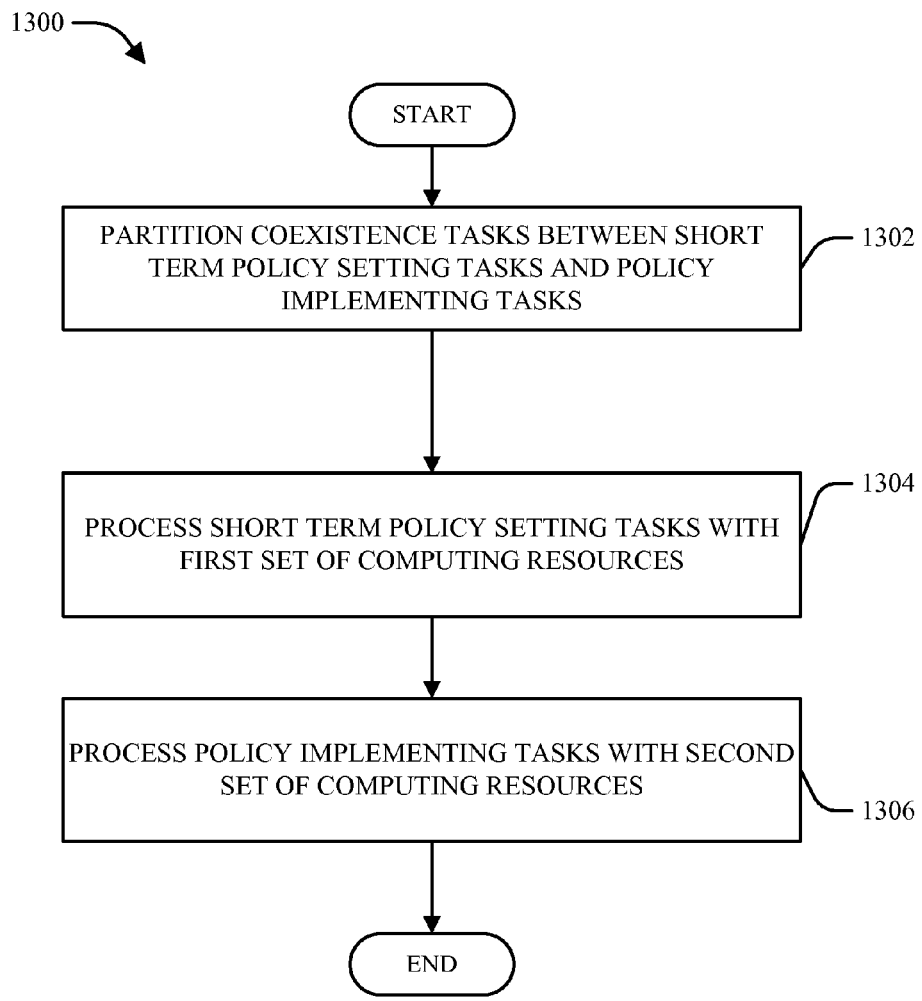
FIG. 13 is a flow diagram of a methodology for implementing a multi-radio coexistence platform in a control plane in a data plane.

FIG. 13 illustrates a methodology 1300 for implementing a multi-radio coexistence platform in a control plane in a data plane. At block 1302, coexistence tasks are partitioned between short term policy setting tasks and policy implementing tasks. At block 1304, short term policy setting tasks are processed with a first set of communication resources. At block 1306, policy implementing tasks are processed with a second set of communication resources.

In one configuration, the UE configured for wireless communication includes means for partitioning coexistence tasks, means for processing short term policy setting tasks using a first set of computing resources, and means for processing policy implementing tasks using a second set of computing resources. In one aspect, the aforementioned means may be the resource coexistence analyzer 914, and/or the frame offset module 916 configured to perform the functions recited by the aforementioned means. In another aspect, the aforementioned means may be a module or any apparatus configured to perform the functions recited by the aforementioned means.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method for wireless communication comprising:
partitioning coexistence tasks between short term policy defining tasks and policy implementing tasks;
processing short term policy defining tasks using a first set of computing resources of a mobile device, the short term policy defining tasks performing:
determining a grant prediction interval based on a total of a known duration between communications of a first radio access technology (RAT) and a CxM-control plane update boundary offset,
defining a plurality of conditions for arbitrating between the first RAT communication and a second RAT communication during the grant prediction interval, wherein, the plurality of conditions corresponds to a scaled priority factor for the first RAT communication based at least in part on how close the first RAT communication is to completion, and
defining policy implementing tasks, wherein the policy implementing tasks comprise the defined plurality of conditions and responses based at least in part on the corresponding scaled priority factor; and
processing policy implementing tasks using a second set of computing resources of the mobile device.

2. The method of claim 1 in which the first set of computing resources comprises control plane resources and the second set of computing resources comprises data plane resources.

3. The method of claim 1 in which the second set of computing resources is assigned to perform just-in-time execution of tasks and the first set of computing resources is assigned to perform slower execution of tasks.

4. The method of claim 1 in which processing policy implementing tasks comprises:

determining a first time, after which a first event from a first radio is not to be interrupted;
determining a second time when a second event from a second radio is to begin;
comparing the first time to the second time; and
granting either the first event or the second event based on the comparing.

5. The method of claim 4 in which the determining the first time is based on a weighted priority of the first event, the weighted priority increasing as the first event progresses.

6. The method of claim 4 in which the comparing comprises comparing the first time to the second time when determining a priority of the first event is the same as a priority of the second event.

7. An apparatus operable in a wireless communication system, the apparatus comprising:
means for partitioning coexistence tasks between short term policy defining tasks and policy implementing tasks;
means for processing short term policy defining tasks using a first set of computing resources of a mobile device, the short term policy defining tasks performing:
determining a grant prediction interval based on a total of a known duration between communications of a first radio access technology (RAT) and a CxM-control plane update boundary offset,
defining a plurality of conditions for arbitrating between the first RAT communication and a second RAT communication during the grant prediction interval, wherein, the plurality of conditions corresponds to a scaled priority factor for the first RAT communication based at least in part on how close the first RAT communication is to completion, and
defining policy implementing tasks, wherein the policy implementing tasks comprise the defined plurality of conditions and responses based at least in part on the corresponding scaled priority factor; and
means for processing policy implementing tasks using a second set of computing resources of the mobile device.

8. The apparatus of claim 7 in which the means for processing policy implementing tasks comprises:
means for determining a first time, after which a first event from a first radio is not to be interrupted;
means for determining a second time when a second event from a second radio is to begin;
means for comparing the first time to the second time; and
means for granting either the first event or the second event based on the comparing.

9. The apparatus of claim 8 in which the means for determining the first time is based on a weighted priority of the first event, the weighted priority increasing as the first event progresses.

10. The apparatus of claim 8 in which the means for comparing comprises means for comparing the first time to the second time when determining a priority of the first event is the same as a priority of the second event.

11. A computer program product configured for wireless communication, the computer program product comprising:
a non-transitory computer-readable medium having program code recorded thereon, the program code comprising:
program code to partition coexistence tasks between short term policy defining tasks and policy implementing tasks;

program code to process short term policy defining tasks using a first set of computing resources of a mobile device, the short term policy defining tasks performing:
- determining a grant prediction interval based on a total of a known duration between communications of a first radio access technology (RAT) and a CxM-control plane update boundary offset,
- defining a plurality of conditions for arbitrating between the first RAT communication and a second RAT communication during the grant prediction interval, wherein, the plurality of conditions corresponds to a scaled priority factor for the first RAT communication based at least in part on how close the first RAT communication is to completion, and
- defining policy implementing tasks, wherein the policy implementing tasks comprise the defined plurality of conditions and responses based at least in part on the corresponding scaled priority factor; and program code to process policy implementing tasks using a second set of computing resources of the mobile device.

12. The computer program product of claim 11 in which the program code to process policy implementing tasks comprises:
- program code to determine a first time, after which a first event from a first radio is not to be interrupted;
- program code to determine a second time when a second event from a second radio is to begin;
- program code to compare the first time to the second time; and
- program code to grant either the first event or the second event based on the comparing.

13. The computer program product of claim 12 in which the program code to determine the first time is based on a weighted priority of the first event, the weighted priority increasing as the first event progresses.

14. The method of claim 12 in which the program code to compare comprises program code to compare the first time to the second time when determining a priority of the first event is the same as a priority of the second event.

15. An apparatus configured for operation in a wireless communication network, the apparatus comprising:
- a memory; and
- at least one processor coupled to the memory, the at least one processor being configured:
  - to partition coexistence tasks between short term policy defining tasks and policy implementing tasks;
  - to process short term policy defining tasks using a first set of computing resources of a mobile device, the short term policy defining tasks performing:
    - determining a grant prediction interval based on a total of a known duration between communications of a first radio access technology (RAT) and a CxM-control plane update boundary offset,
    - defining a plurality of conditions for arbitrating between the first RAT communication and a second RAT communication during the grant prediction interval, wherein, the plurality of conditions corresponds to a scaled priority factor for the first RAT communication based at least in part on how close the first RAT communication is to completion, and
    - defining policy implementing tasks, wherein the policy implementing tasks comprise the defined plurality of conditions and responses based at least in part on the corresponding scaled priority factor; and
  - to process policy implementing tasks using a second set of computing resources of the mobile device.

16. The apparatus of claim 15 in which the first set of computing resources comprises control plane resources and the second set of computing resources comprises data plane resources.

17. The apparatus of claim 15 in which the second set of computing resources is assigned to perform just-in-time execution of tasks and the first set of computing resources is assigned to perform slower execution of tasks.

18. The apparatus of claim 15 in which the at least one processor being configured to process policy implementing tasks comprises the at least one processor being configured:
- to determine a first time, after which a first event from a first radio is not to be interrupted;
- to determine a second time when a second event from a second radio is to begin;
- to compare the first time to the second time; and
- to grant either the first event or the second event based on the comparing.

19. The apparatus of claim 18 in which the at least one processor being configured to determine the first time is based on a weighted priority of the first event, the weighted priority increasing as the first event progresses.

20. The method of claim 18 in which the at least one processor being configured to compare comprises the at least one processor being configured to compare the first time to the second time when determining a priority of the first event is the same as a priority of the second event.

* * * * *